(No Model.) 2 Sheets—Sheet 1.

J. F. McLAUGHLIN.
CLOSED CONDUIT ELECTRIC RAILWAY.

No. 535,993. Patented Mar. 19, 1895.

Witnesses:
Jas. H. Blackwood
Robert B. Blackwood

Inventor,
James F. McLaughlin,
By Joseph Lyons.
Attorney.

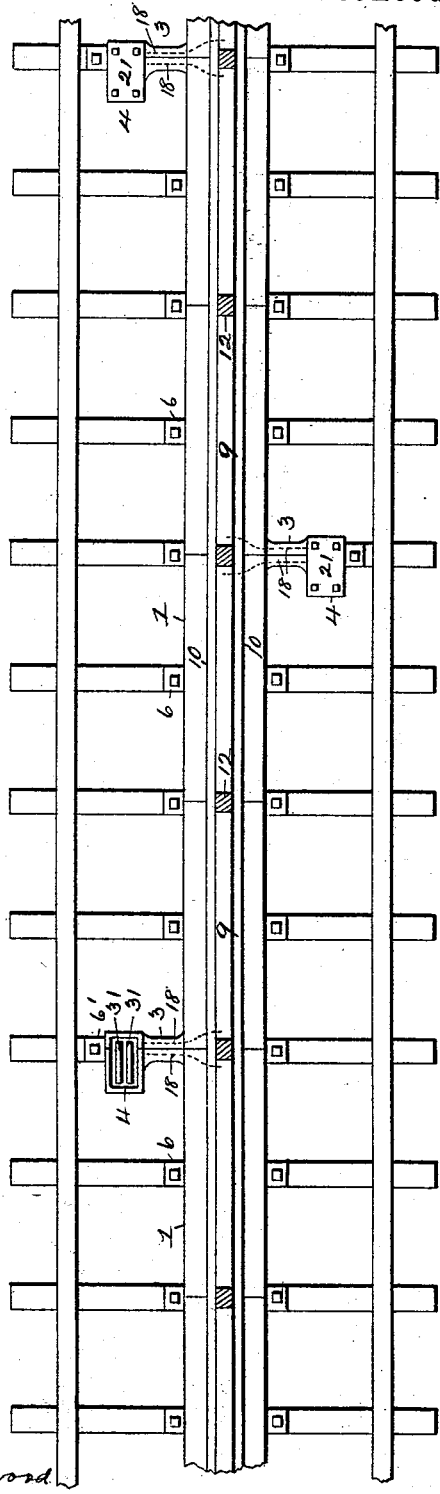

UNITED STATES PATENT OFFICE.

JAMES F. McLAUGHLIN, OF PHILADELPHIA, PENNSYLVANIA.

CLOSED-CONDUIT ELECTRIC RAILWAY.

SPECIFICATION forming part of Letters Patent No. 535,993, dated March 19, 1895.

Application filed October 23, 1894. Serial No. 526,715. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Closed-Conduit Electric Railways, of which the following is a specification.

This invention has reference to improvements in electric railways of the underground closed-conduit type, the present invention having for its object the thorough insulation of the feeding and working conductors and the use of a minimum number of switches for closing the circuit between the feeding and working conductors, the switches being operated by electro magnets carried upon the car. All this will more fully appear from the following detail description, taken in connection with the accompanying drawings, in which—

Figure 1:
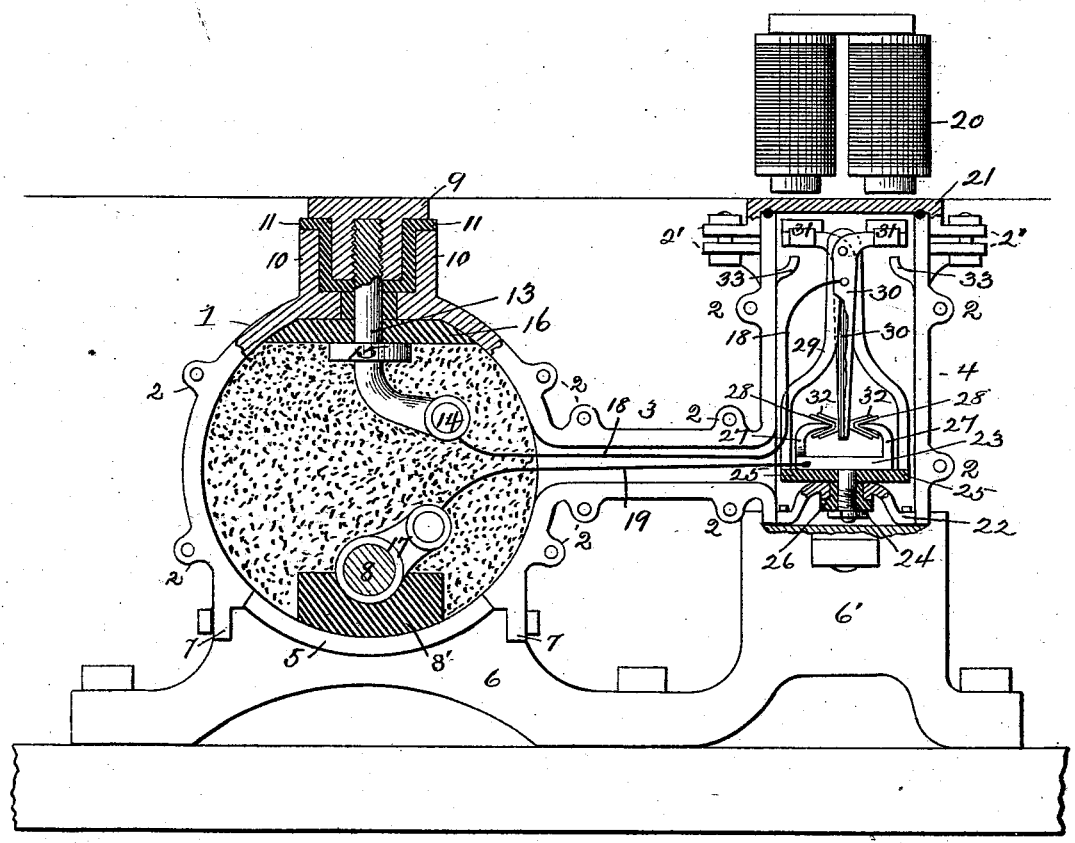
Figure 3:
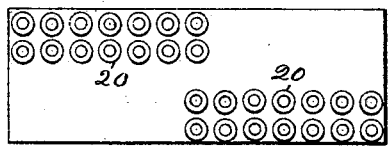

Figure 1, is an end view partly in section of the conduit, equipped with the improved devices. Fig. 2, is a plan view of the road bed and conduit with the filling-in material removed, and Fig. 3, is a diagrammatic view of the bottom of a motor car showing the disposition of the operating magnets on the same.

Like numerals of reference indicate like parts throughout the drawings.

Referring to the drawings, there is shown a conduit composed of cylindrical sections 1, placed end to end, and joined by bolts passed through ears 2, cast on the sections at the proper points.

Projecting laterally from the conduit are necks 3, terminating in open-ended rectangular boxes 4, for housing switching mechanism to be hereinafter described, and which will, therefore, be referred to as the switch boxes. These switch boxes may be cast on the sections at one side of but near the joint, or may be right at the joint. In the latter case, which is the structure shown in the drawings, the switch boxes and necks are divided into two parts in the same vertical plane as the coinciding conduit joints, one half of the neck, with the corresponding part of the switch box, being cast on the end of each of two contiguous conduit sections. The division of the neck and switch box into two parts greatly facilitates the introduction of the switch mechanism and electric connections hereinafter described. The neck and box sections are secured together by bolts passed through ears 2, cast thereon.

A portion or plate 5, constituting the bottom of each conduit section, is made removable so that access to the interior of the conduit may be had for assembling certain of the parts.

The conduit is supported upon castings 6, fixed at intervals to the cross-ties on which the traffic rails are laid, and the conduit sections are secured to the supports by screws passing through ears 7, on the sections and entering nuts tapped into the supports. When the conduit is secured in place on the supports the latter serve to lock the bottom plates 5, firmly in place.

Within the conduit is a main or supply conductor 8, supported on insulating material 8', on the bottom plates 5. This conductor may be formed in one piece or it may be made in sections, corresponding in length to the conduit sections, and connected at the ends so as to be electrically continuous.

Extending centrally along the top of the conduit is a sectional working conductor 9, seated in a channel formed by two parallel ribs 10, cast on the top of the conduit sections. The sections of the working conductor are each a little less in length than the conduit sections from which they are separated by insulating material 11.

The sections of the working conductors are widened as shown in Fig. 1, to partly overlap the tops of the flanges 10, and when the conduit is in place in the road bed the upper face of the conductor 9, is flush with and exposed on the surface of the road bed while the ends of the sections of the conductor are separated a short distance by interposed insulating blocks 12, as shown in Fig. 2.

The sections of the conductor 9, are secured in place in any suitable manner as by screws or bolts and at one end of each section there is secured to it a connector 13, composed of a bolt, extending upward through a hole, lined with insulating material, in the conduit, and having its lower end, bent at an angle and terminating in an eye 14. Just above the angular extension of the bolt it has formed on it an annular flange 15, between which and the top of the conduit there is confined an insulating plate or washer 16. The upper end of the bolt screws into the conductor section and serves to hold the end of the same in its seat, thereby replacing other fastening devices at this point.

Two connectors 13, one on each of the contingnous ends of two sections of the conductor 9, and a like angular connector 17, on the main conductor 8, are situated adjacent to each neck 3, and branch conductors 18, and 19, respectively, (shown in diagram only) extend from these connectors, through the neck 3, to the corresponding switch box, where they are joined to the switching mechanism in a manner to be described farther on.

Within each switch box there is a switch-mechanism designed to be operated by electro-magnets 20, hung from a motor car, so as to pass close to the top of the switch box. This top is flush with the surface of the road bed and is composed of a cover 21, preferably of non-magnetic metal, secured to the upper end of the box by bolts passing through ears 2', on the box and cover.

The switch mechanism is constructed as follows: Secured to the bottom of the switch box is a bracket 22, carrying a metal plate 23, having a downwardly extending threaded pin 24, receiving a nut, as shown. A plate 25, of insulating material is interposed between the metal plate 23, and the bracket 22, while the pin and nut are insulated from the bracket by a flanged washer 26. Rising from opposite ends of the plate 23, but in different vertical planes are two arms 27, with their free ends bent at an angle so as to extend inwardly over the plate, where they carry at their ends heavy spring contact plates 28. Pivoted to the upper end of a standard 29, erected on the insulating plate 25, are two switch arms 30, with their upper ends extending laterally, but oppositely, from the pivot and terminating in armatures 31, and with their lower ends carrying heavy spring contact plates 32, in operative relation to the fixed contacts 28. The armatures overbalance the contact ends of the switch arms so that, normally, the contact plates 32, are out of engagement with the contact plates 28. The movement of the switch arms in this direction is limited by stops 33, on the box, in the path of the armatures. The conductors 18, coming from two adjacent connectors 13, are connected to the switch arms as indicated, or they may be connected to the standard 29, if desired. The conductor 19, coming from the supply conductor, is connected to the plate 23.

When a magnet 20, on the motor car passes over the switch box, the armatures 31, are attracted and the switch arms are moved to close the circuit at the contacts 28 and 32. The current then passes from the main conductor 8, by branch conductor 19, to the plate 23, thence by the arms 27, and contacts 28, and 32, to both switch arms 30, in multiple, thence by conductors 18, and connectors 13, to two contiguous sections of the conductor 9, from whence the current is collected by suitable brushes or rollers and passes to the motor on the car, returning to the generator by the traffic rails or in any other manner.

As before stated, the switches are operated by magnets on the motor car. By this means, only those sections of the working conductor that are covered by the motor car are in circuit and therefore there is no danger of accidental contact therewith. For this purpose, the conduit sections, and consequently the sections of the working conductor, are made of such length as to average about four to the length of a motor car, and the switch boxes are located at every other joint, but alternately on opposite sides of the conduit. On the car are two series of electro-magnets 20, one series on one side of the car and extending from one end to the middle, and the other series on the other side of the car and extending from the middle to the other end, the two series slightly overlapping.

The arrangement of the electro-magnets is such that one switch is held closed by one series of magnets until the next succeeding one has been closed by the other series of magnets, by which time the first series of magnets has passed beyond the first switch, the switches being operated alternately in this manner so long as the car is kept in motion, with the magnets engaged either from the main circuit or by an independent circuit fed from a source of power, as a secondary battery for instance, carried upon car.

In order to prevent any danger of a short circuit being established between the sectional conductor and the conduit sections the road bed is topped with asphalt in the usual manner; also, when the conduit sections are laid, the danger of interior short-circuits may be effectually prevented by filling the conduit sections, as they are laid, with insulating cement as indicated in Fig. 1.

Having now described my invention, what I claim, and desire to secure by Letters Patent, is—

1. An electric railway provided with a conduit composed of sections having switch boxes connected thereto by laterally extending necks, in combination with supports having extensions forming the bottoms of the switch boxes, substantially as described.

2. In an electric railway the combination with a closed conduit provided with main and supply conductors, of switch boxes arranged alternately on opposite sides of the conduit and provided with switching mechanism for coupling the main conductor with sections of the working conductor, and two series of electro magnets, on opposite sides of a motor car, in line with the switch boxes, for operating the switches therein by magnetic attraction, substantially as described.

3. In an electric railway a conduit composed of sections joined end to end, and switch boxes connected to the conduit by laterally extending necks, each switch box and its neck being coincident with and divided into two parts in the vertical plane of a conduit joint, substantially as described.

In testimony whereof I have signed my name to this specification in the presence of two subscribing witnesses.

JAMES F. McLAUGHLIN.

Witnesses:
 THEO. CANFIELD, Jr.,
 DAVID A. DREW, Jr.